United States Patent
Tsuji (10) Patent No.: US 9,575,439 B2
(45) Date of Patent: Feb. 21, 2017

(54) TRANSFER MEMBER FOR ELECTROPHOTOGRAPHY AND ELECTROPHOTOGRAPHIC IMAGE FORMING APPARATUS

(71) Applicant: CANON KABUSHIKI KAISHA, Tokyo (JP)

(72) Inventor: Yasutomo Tsuji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/685,527

(22) Filed: Apr. 13, 2015

(65) Prior Publication Data
US 2015/0293478 A1 Oct. 15, 2015

(30) Foreign Application Priority Data
Apr. 14, 2014 (JP) .................. 2014-082768

(51) Int. Cl.
*B32B 27/28* (2006.01)
*B32B 33/00* (2006.01)
*G03G 15/16* (2006.01)

(52) U.S. Cl.
CPC ............. *G03G 15/162* (2013.01); *B32B 27/28* (2013.01); *B32B 33/00* (2013.01)

(58) Field of Classification Search
None
See application file for complete search history.

(56) References Cited

U.S. PATENT DOCUMENTS

| 5,677,406 A | 10/1997 | Tazelaar et al. |
| 2012/0064350 A1 | 3/2012 | Honya et al. |

(Continued)

FOREIGN PATENT DOCUMENTS

| JP | 9-138594 A | 5/1997 |
| JP | 2012-78801 A | 4/2012 |

OTHER PUBLICATIONS

U.S. Appl. No. 14/714,869, filed May 18, 2015. Inventor: Eiichi Hamana, et al.

*Primary Examiner* — Ramsey Zacharia
(74) *Attorney, Agent, or Firm* — Fitzpatrick, Cella, Harper & Scinto

(57) ABSTRACT

Provided a transfer member for electrophotography of a multilayer structure including a surface layer having a surface for carrying toner is provided.

The surface layer contains a graft type copolymer comprising a polymer having a structure represented by formula (1) as a main chain, and a group containing a structure represented by formula (2) and a group containing a structure represented by formula (3) each bonded to the main chain as a side chain. The surface of the surface layer has a matrix phase formed by a group containing a structure represented by formula (2) and a domain phase formed by a group containing a structure represented by formula (3):

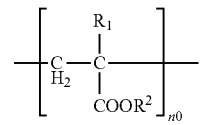

Formula (1)

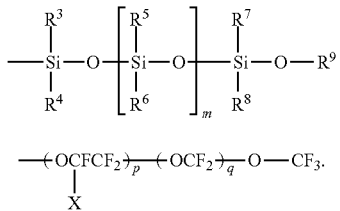

Formula (2)

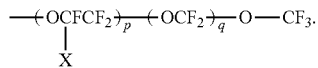

Formula (3)

8 Claims, 2 Drawing Sheets

(56) References Cited

U.S. PATENT DOCUMENTS

2014/0162068 A1 6/2014 Yoshida et al.
2014/0370296 A1 12/2014 Tsuji

TRANSFER MEMBER FOR ELECTROPHOTOGRAPHY AND ELECTROPHOTOGRAPHIC IMAGE FORMING APPARATUS

BACKGROUND OF THE INVENTION

Field of the Invention

The present invention relates to a transfer member for electrophotography having a low-adhesion surface layer which is used in an image forming apparatus of an electrophotographic system such as a copying machine and a printer.

Description of the Related Art

In recent years, an intermediate transfer system has been used in a color electrophotographic apparatus. In the intermediate transfer system, developed images in four colors of yellow, magenta, cyan and black are once successively transferred (primary transfer) from a photosensitive member to an intermediate transfer member, and then color images formed on the intermediate transfer member are collectively transferred (secondary transfer) to a transfer material such as paper. As the intermediate transfer member used here, for example, a semi-conductive belt containing carbon black dispersed in a polyimide resin is known.

However, in the image forming apparatus in which high image quality and high durability are required, such a semi-conductive belt itself may not be sufficient. High image quality as described here refers to the fact that a toner image is secondarily transferred at a high transfer rate from a belt to a transfer material (for example, paper). When the transfer rate is low, an omission may occur in the toner image transferred to the transfer material; density unevenness may occur in the image outputted in this state; and color unevenness may occur in the transfer of four-color images. Further, high durability refers to the state where a high transfer rate is maintained in the secondary transfer process, and density unevenness and color unevenness hardly occurs even in repeated image output.

Japanese Patent Application Laid-Open No. H09-138594 and Japanese Patent Application Laid-Open No. 2012-078801 each disclose, in order to achieve high image quality, an effective technique of imparting excellent secondary transferability by coating the surface of a transfer member with a low-adhesion material such as a fluororesin and a silicone resin to improve toner release properties.

Specifically, Japanese Patent Application Laid-Open No. H09-138594 discloses a technique of reducing adhesion of remaining toner or the like by incorporating a linear perfluoropolyether rubber into a surface layer.

Further, Japanese Patent Application Laid-Open No. 2012-078801 discloses a technique of forming a hard-coat layer by coating the surface of a transfer member with a graft type copolymer resin having a polymerizable fluororesin as a main chain and polysiloxane as a side chain and curing the coating film by a curing unit such as ultraviolet irradiation. In this technique, the polysiloxane side chain chemically bonded to the main chain provides excellent physical resistance such as damage resistance and wear resistance, and good secondary transferability derived from the main chain is imparted to the transfer member.

One aspect of the present invention is directed to providing a transfer member for electrophotography which has excellent secondary transferability to prevent occurrence of density unevenness and color unevenness in a printed image and has resistance to physical degradation in the transfer process of an electrophotographic system.

Another aspect of the present invention is directed to providing an electrophotographic image forming apparatus which can stably form a high quality electrophotographic image.

SUMMARY OF THE INVENTION

According to one aspect of the present invention, there is provided a transfer member for electrophotography of a multilayer structure including a surface layer having a surface for carrying toner, wherein the surface layer contains a graft type copolymer including a polymer having a structure represented by formula (1) as a main chain, and a group containing a structure represented by formula (2) and a group containing a structure represented by formula (3) each bonded to the main chain as a side chain; and the surface of the surface layer has a matrix phase formed by a group containing a structure represented by formula (2) and a domain phase formed by a group containing a structure represented by formula (3).

Formula (1)

wherein $R^1$ represents a hydrogen atom or a methyl group; $R^2$ represents a hydrogen atom or a hydrocarbon group having 1 to 10 carbon atoms; and n0 represents an integer of 2 or more.

Formula (2)

wherein $R^3$, $R^4$, $R^5$, $R^6$, $R^9$, $R^8$, and $R^9$ each independently represent a hydrogen atom or a hydrocarbon group having 1 to 10 carbon atoms; and m represents an integer of 2 or more.

Formula (3)

wherein X represents a fluorine atom or trifluorocarbon; p and q each independently represent an integer of 0 or more; and "p+q" represents an integer of 2 or more.

According to another aspect of the present invention, there is provided an electrophotographic image forming apparatus including a first image bearing member, an intermediate transfer member, a device which primarily transfers a toner image formed on the first image bearing member to the intermediate transfer member and a device which secondarily transfers the toner image primarily transferred to the intermediate transfer member to a second image bearing member, wherein the intermediate transfer member is the above-described transfer member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

According to the investigation of the present inventors, the transfer member described in Japanese Patent Application Laid-Open No. H09-138594 has been recognized to have excellent secondary transferability because the transfer member contains perfluoropolyether. However, since the surface layer is formed of a flexible rubber, the surface layer has a relatively low hardness and has been recognized to have insufficient wear resistance and damage resistance to repeated image output. Particularly, the surface of the surface layer is rubbed by sliding with a sliding member (for example, cleaning blade) mounted on an image forming apparatus, the sliding being performed to remove remaining toner and the like on the transfer member, and by toner and a toner external additive interposed between the sliding member and the surface layer of the transfer member, thus probably causing physical degradation such as wear and slipping down of a perfluoropolyether component.

Further, according to the investigation of the present inventors, a technique according to Japanese Patent Application Laid-Open No. 2012-078801 uses a graft type copolymer resin having a polymerizable fluororesin as a main chain and polysiloxane as a side chain, but the secondary transferability of the copolymer resin tends to be poorer than that of a pure fluororesin. This reflects the physical properties of polysiloxane which is a graft chain, and is probably because the contribution of a fluororesin to the surface of a belt is relatively small. Therefore, it is difficult to obtain sufficient secondary transferability compared with a pure fluororesin.

The present inventors have intensively studied based on the above investigation and completed the present invention.

A suitable embodiment of the present invention will be described below.

A transfer member for electrophotography according to one embodiment of the present invention has a layer having a surface for carrying toner (hereinafter also referred to as a "surface layer"). Examples of specific layered structures include a two-layer structure of a base layer and a surface layer and a three-layer structure of a base layer, an intermediate layer such as a rubber layer and a surface layer.

Figure 1:
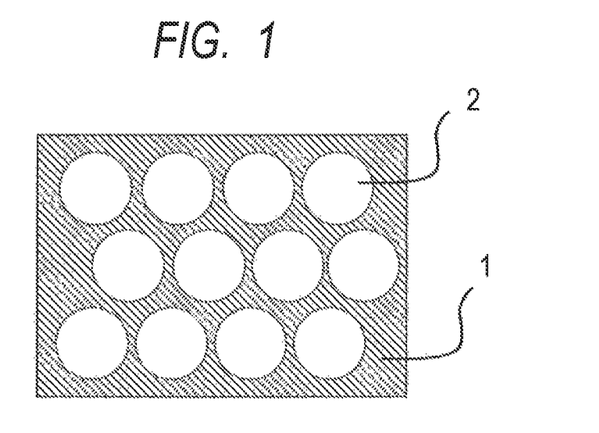
FIG. 1 is a schematic view of the surface of a surface layer of an intermediate transfer member according to one embodiment of the present invention.
Figure 2:
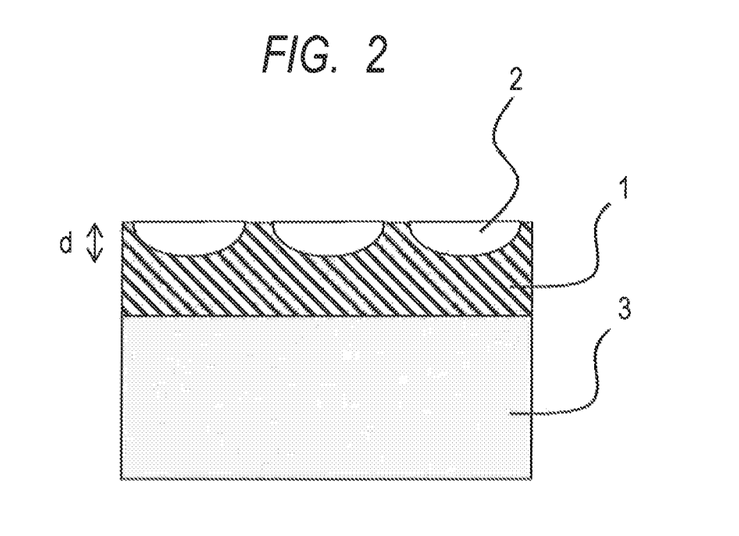
FIG. 2 is a schematic partial sectional view of an intermediate transfer member according to one embodiment of the present invention.

FIG. 1 illustrates a schematic view when a surface layer of a transfer member having a two-layer structure is viewed from above. Further, FIG. 2 illustrates a schematic sectional view of the transfer member. Reference numeral 1 denotes a matrix phase of a surface layer; reference numeral 2 denotes a domain phase; and reference numeral 3 denotes a base layer.

<Base Layer of Transfer Member>

Typical examples of the base layer which is used include a semi-conductive film in which a conducting agent is incorporated into a resin, a cylindrical seamless belt and a semi-conductive roller in which a metal shaft is used as a core metal. Although both thermosetting and thermoplastic resins can be used as a resin, typical examples include the following resins in terms of required properties of high strength and high durability: polyimide, polyamideimide, polyether ether ketone, polyphenylene sulfide, and stretched crystalline polyester. The resin may be a single resin or may be a blended or alloyed mixture. A thermoplastic elastomer or the like can be incorporated into a resin depending on target characteristics such as mechanical strength.

Any one or both of an electron conductive material and an ion conductive material may be used as a conducting agent.

Examples of the electron conductive material which can be used include carbon black, antimony-doped tin oxide, titanium oxide, and a conductive polymer such as polyaniline. Examples of the ion conductive material which can be used include sodium perchlorate, lithium, a cationic or anionic surfactant, a nonionic surfactant, an oligomer having oxyalkylene repeating units, and a polymer compound.

<Surface Layer of Transfer Member>

[Copolymer Resin (Copolymer)]

The surface layer contains a copolymer comprising a polymer having a structure represented by formula (1) as a main chain. Examples of the polymer may include polyacrylate and polymethacrylate.

Further, to the polymer as a main chain, two types of groups are bonded as a side chain. Hereinafter, such a copolymer may be referred to as a "graft type copolymer".

One of the two types of groups is a group containing a structure represented by formula (2), hereinafter also referred to as a "polysiloxane chain", and the other of the two types of groups is a group containing a structure represented by formula (3), hereinafter also referred to as a "perfluoropolyether chain".

Formula (1)

In formula (1), $R^1$ represents a hydrogen atom or a methyl group; $R^2$ represents a hydrogen atom or a hydrocarbon group having 1 to 10 carbon atoms; and n0 represents an integer of 2 or more.

Formula (2)

In formula (2), $R^3$, $R^4$, $R^5$, $R^6$, $R^7$, $R^8$ and $R^9$ each independently represent a hydrogen atom or a hydrocarbon group having 1 to 10 carbon atoms; and m represents an integer of 2 or more.

Formula (3)

In formula (3), X represents a fluorine atom or trifluorocarbon; p and q each independently represent an integer of 0 or more; and "p+q" represents an integer of 2 or more.

A graft type copolymer refers to a polymer having a so-called comb type structure in which another polymer is bonded, as a side chain, to a main chain polymer, and the graft type copolymer may have high functionality which a single polymer does not have.

[Microphase-Separated Structure in Surface Layer]

The surface of the surface layer has a matrix-domain structure derived from a graft type copolymer according to the present invention (hereinafter may be referred to as a "phase-separated structure"). The matrix-domain structure includes a matrix phase formed by a group containing a polysiloxane chain represented by formula (2) and a domain phase formed by a group containing a perfluoropolyether chain represented by formula (3).

Such a phase-separated structure can be verified by observing the surface and cross section of a transfer member with a scanning electron microscope (SEM, XL-300-SFEG manufactured by FEI Company). In the preparation of a cross section, for example, a cross section polisher (SM-09010 manufactured by JEOL Ltd.) can be used to prepare a cross section vertical to the surface.

As a result of observation, a state is observed in which a circular domain phase is uniformly distributed on the surface of a surface layer by a group containing a perfluoropolyether chain as illustrated in FIG. 1. The diameter of a circle of the domain phase, which can be calculated from the scale of the SEM image, is about 0.8 to 1.5 μm. Here, the diameter of a domain phase means the area equivalent diameter of a domain observed in the SEM image. That is to say, the diameter of a domain phase means a diameter of a circle having an area equal to the area of a domain observed in the SEM image.

Further, in the cross-section observation, a domain phase formed by a group containing a perfluoropolyether chain is present only in the vicinity of the surface of a surface layer, and the domain phase is not present in other regions of the surface layer, as illustrated in FIG. 2. The depth of the domain phase, that is, the shortest distance from a position most apart from the surface of a surface layer of the domain phase to the surface of the surface layer (distance d in FIG. 2), can be calculated and determined from the scale of an SEM image. A domain phase has a depth of about 10 to 15% of the thickness of a surface layer.

A main operation effect of the surface layer having the above-mentioned phase-separated structure is to provide a transfer member excellent in secondary transferability even in repeated image output by allowing the surface to carry a phase-separated structure including a matrix phase formed by a group containing a polysiloxane chain and a domain phase formed by a group containing a perfluoropolyether chain. The surface layer has, on the surface, polysiloxane having high hardness and excellent in physical resistance compared with fluororesin and a perfluoropolyether chain which can impart excellent secondary transferability to the surface compared with fluororesin. Further, the surface layer has resistance to physical degradation by slipping down or wear because two types of groups are each chemically bonded to the main chain as a side chain.

It is generally difficult for both a compound having low surface energy and a compound having high surface energy to be present on the surface at the same time, and, for example, it is generally known that since fluororesin has a particularly low surface energy, generally, fluororesin is preferentially unevenly distributed on the surface. The feature of the present invention is that two types of components, polysiloxane and perfluoropolyether, which have a surface energy difference, can be present on the surface at the same time by microphase separating the two types of components.

Formation of such a phase-separated structure utilizes the property that a repulsive force interaction acts between a polysiloxane side chain and a perfluoropolyether side chain which are different types of polymer chains and the property that the same type of polymer chains are aggregated. In a graft copolymer resin, the movement of the two graft side chains in the resin are limited because the two graft side chains are each chemically bonded to the main chain. This suppresses the segregation of only one of the side chains (only perfluoropolyether which is most effective to stabilize the surface energy of an interface) on the surface, and two types of side chains segregate on the surface at the same time. Further, the microphase-separated structure is probably formed by the repulsive force interaction between different types of polymer chains and the aggregation action between the same type of polymer chains.

[Mass Ratio of Side Chain to Main Chain]

In order to obtain the microphase-separated structure as described above, in the graft copolymer resin, the mass ratio of the group containing a polysiloxane chain to 100 mass % of the main chain can be 5 to 40 mass %, and the mass ratio of the group containing a perfluoropolyether chain to 100 mass % of the main chain can be 10 to 25 mass %.

When the mass ratio of each of the group containing a polysiloxane chain to the main chain and the group containing a perfluoropolyether chain to the main chain is set within the above range, the microphase-separated structure including a matrix phase formed by the group containing a polysiloxane chain and a domain phase formed by the group containing a perfluoropolyether chain can be stably present on the surface of a surface layer.

The size of the domain phase and the proportion of the domain phase in the surface in the surface layer of the transfer member according to the present invention are almost unambiguously given, and the size of the domain phase of perfluoropolyether is at a level that is sufficiently excellent in the secondary transferability of toner. Further, since the side chains are chemically bonded to the main chain as described above, physical resistance is improved. Furthermore, since polysiloxane having higher hardness than perfluoropolyether forms a matrix phase on the surface of the surface layer, surface hardness can be further improved. Therefore, better physical resistance can be imparted than the case where a perfluoropolyether side chain is singly used.

Further, although fluororesin is generally a chemically stable resin excellent in water and oil repellency and heat resistance, the resin has a low resistance to discharge. That is, in the electrophotographic image forming apparatus, the fluorine component is decomposed by the discharge generated in the application of transfer voltage during repeated image output. Therefore, it has been difficult to maintain a high transfer rate in the secondary transfer process by the techniques described in the above-described Japanese Patent Application Laid-Open No. H09-138594 and Japanese Patent Application Laid-Open No. 2012-078801.

On the other hand, other effects of the transfer member according to the present invention include the fact that excellent secondary transferability can be maintained even when the perfluoropolyether chain in a domain is decomposed by the discharge by repeated image output.

The mechanism of action is probably because fine recesses are formed when the domain phase on the surface of a surface layer is shaved by sliding with a sliding member and a transfer material. That is, in the domain phase formed by a group containing a perfluoropolyether chain, the perfluoropolyether chain in the domain phase is gradually decomposed in a discharge environment as described above. However, the domain phase on the outermost surface is shaved off by sliding with a sliding member (for example, cleaning blade) mounted on the image forming apparatus and a transfer material such as paper. Here, since a domain phase formed by a group containing a perfluoropolyether chain has a lower hardness than a matrix phase formed by a group containing a polysiloxane chain, the domain phase is shaved more preferentially than the matrix phase. As a result, fine recesses are formed on the surface as a trace of the domain phase. The surface of a surface layer on which the fine recesses are formed is effective for reducing the contact area of toner and has a physical shape that contributes to excellent secondary transferability as a substitute of the deactivated perfluoropolyether chain.

<Production of Transfer Member>

The above-mentioned surface can be formed by first suitably diluting and mixing the following raw material[1], raw material[2], and raw material[3] to obtain a composition for forming a surface layer of an intermediate transfer member, then applying the composition to a base layer, and starting polymerization reaction using various curing units.

Raw material[1]: A prepolymer of polyacrylate or polymethacrylate each having a graft reactive site, or a polyacrylate-polymethacrylate copolymer type prepolymer having a graft reactive site, Raw material[2]: Polysiloxane having a functional group polymerizable with a main chain, and Raw material[3]: Perfluoropolyether having a functional group polymerizable with a main chain.

Usable examples of a method of applying the composition for forming a surface layer include dip coating, ring coating, slit coating, spray coating, roll coating, and spin coating. After the application, a solvent is removed by drying at a temperature of about 60° C. to 90° C., and then the coating film is irradiated with electron beams, ultraviolet rays or the like to subject the composition to polymerization reaction to cure the coating film to form a surface layer. At this time, a polymerization initiator such as IRGACURE (manufactured by Ciba-Geigy Corporation) can be suitably used. Further, known additives for imparting functionality as described above such as a conducting agent, an antioxidant, a leveling agent, a crosslinking agent, a polymerization inhibitor, a viscosity controlling agent, and a flame retardant can also be suitably blended with the composition.

The thickness of a surface layer can be suitably controlled to a desired value by controlling film forming conditions such as solids concentration and a film forming rate. The thickness of the surface layer can be 1 μm or more when wear and damage under durability conditions in an actual apparatus are taken into consideration, and can be 20 μm or less when flexing resistance or the like when stretching a belt is taken into consideration. Further, when further flexing resistance is required, the thickness of the surface layer can be 10 μm or less.

Further, it is required that the transfer member obtained by forming a surface layer on a base layer be semi-conductive similar to a base layer. Therefore, a conducting agent can be contained also in the surface layer, and a conducting agent listed when used in a base layer can be used. Regarding the electric resistance of a transfer member after a surface layer is formed on a base layer, the volume resistivity can generally be $1.0\times10^8$ Ω·cm or more and $1.0\times10^{14}$ Ω·cm or less.

Further, the surface resistivity measured from the surface layer side can be $1.0\times10^7$ Ω/| or more and $1.0\times10^{18}$ Ω/| or less. Occurrence of poor transfer images due to the shortage of transfer bias accompanying the charge up in a low-humidity environment or during continuous drive, or due to the leakage of transfer bias in a high-humidity environment can be suppressed by setting the electric resistance of a transfer member within the range of the semiconductive region as described above.

The surface layer of the transfer member according to the present invention contains a graft copolymer resin obtained by polymerizing the above-described raw material[1], raw material[2] and raw material[3]. The raw material[1], raw material[2] and raw material[3] which are used in the production of the graft copolymer resin will be described below.

[Raw Material[1] for Main Chain]

The raw material[1] used in the production of a polymer chain containing polyacrylate or polymethacrylate each having a structure represented by formula (1) which forms a main chain is a macromonomer which is a prepolymer of polyacrylate or polymethacrylate, or a polyacrylate-polymethacrylate copolymer type prepolymer. The macromonomer as described here refers to a macromolecular monomer having a polymerizable reactive group, and the macromonomer can easily synthesize a graft polymer by copolymerizing with other monomers. Particularly, acrylic macromonomers are widely used in a coating material field because the use of the macromonomer allows radical polymerization, and allows resins having different physical properties to be simply incorporated as side chains with good purity.

Examples of graft reactive sites between these macromonomers and side chains include a radically polymerizable unsaturated bond group such as an acrylic group and a methacrylic group. Examples of a method for connecting a reactive group serving as a graft reactive site to a main chain include, but are not limited to, a method of allowing a main chain having a hydroxy group to react with a radically polymerizable monomer having an isocyanate group at room temperature to 80° C. in the absence or presence of a catalyst to form a urethane bond.

Further, a functional group such as an alkyl group can be suitably introduced into a prepolymer of polyacrylate or polymethacrylate or a polyacrylate-polymethacrylate copolymer type prepolymer in order not only to introduce a graft reactive site but also to improve compatibility with a solvent or various additives. The introduction of a functional group also allows the control of physical properties and the imparting of functionality in a graft copolymer resin. Examples of typical macromonomers include "Macromonomer 45%-AA6" (methyl methacrylate) and "Macromonomer AB6" (butyl acrylate) manufactured by Toagosei Co., Ltd.

[Raw Material[2] for Side Chain]

The raw material[2] used in the production of a polysiloxane chain having a structure represented by formula (2) which forms a side chain is a one end-modified polysiloxane compound having a functional group polymerizable with a main chain, and is a compound having a reactive group serving as a graft reactive site with a main chain.

Examples of such a reactive group include a radically polymerizable unsaturated bond group such as an acrylic group and a methacrylic group. In order to form a graft skeleton, the reactive group such as the above-described radically polymerizable unsaturated bond group needs to be introduced into one end of polysiloxane.

The connecting between a polysiloxane compound and a reactive group can be performed by silane coupling or the like, and the connecting between a polysiloxane compound and a reactive group may be performed through hydrocarbon. Alternatively, a radically polymerizable unsaturated bond such as a vinyl group and an acrylic group can be directly connected to one end of polysiloxane. $R^3$ to $R^9$ in formula (2) each independently represent a hydrogen atom or hydrocarbon having 1 to 10 carbon atoms.

In order to form a microphase-separated structure according to one embodiment of the present invention, the molecular weight of a polysiloxane chain in the groups forming graft side chains is an integer of 2 or more, preferably an integer of 10 or more, more preferably an integer of 30 or more, in terms of the degree of polymerization m in formula (2).

This is because if the degree of polymerization m of the polysiloxane chain is less than 2, the content of the polysiloxane chain in a graft type copolymer resin is too low to form a microphase-separated structure with a perfluoropolyether chain. Although the upper limit of the molecular weight of the polysiloxane chain is not particularly limited, the degree of polymerization m can be or less when film formability, film hardness and the like are taken into consideration. The raw material[2] used in the production of the polysiloxane chain in such a category may be prepared by a known method, or a commercially available product may also be used as the raw material[2]. Examples of commercially available products include "Silaplane FM-0711" (number average molecular weight: 1,000), "Silaplane FM-0721" (number average molecular weight: 5,000), and "Silaplane FM-0725" (number average molecular weight: 10,000) all manufactured by Chisso Corporation, and "X-22-174DX" (number average molecular weight: 4,600) manufactured by Shin-Etsu Chemical Co., Ltd. These one end-modified polysiloxanes may be used singly or in combination of two or more.

Further, the mass ratio of the raw material[2] to the raw material[1], which is required for a graft type copolymer resin to form a microphase-separated structure on the surface of a surface layer, can be 5 to 40 mass % of the raw material[2] relative to 100 mass % of the raw material [1]. If the mass ratio is less than 5 mass %, the region of the matrix phase of a polysiloxane chain on the surface of a surface layer will decrease, whereas the size of the domain phase of a perfluoropolyether chain will increase. Therefore, since the domain phase of a perfluoropolyether chain is unevenly distributed over the whole surface, it is difficult to obtain a microphase-separated structure. Further, if mass ratio is more than 40 mass %, the region of the matrix phase on the surface of a surface layer will increase, and the size of the domain phase of a perfluoropolyether chain will excessively decrease. Therefore, it is difficult to obtain a microphase-separated structure effective in low adhesion.

[Raw Material[3] for Side Chain]

The raw material[3] used in the production of a perfluoropolyether chain having a structure represented by formula (3) which forms the other side chain is a one end-modified perfluoropolyether compound having a reactive group polymerizable with a main chain. This raw material [3] is a compound having a reactive group serving as a graft reactive site with a main chain similar to the polysiloxane compound of the raw material[2]. Examples of such a reactive group include a radically polymerizable unsaturated bond group such as an acrylic group and a methacrylic group. Although a method for connecting a reactive group to a perfluoropolyether compound is not particularly limited, a graft reactive site can be connected, for example, by connecting perfluoropolyether having a hydroxy group to acrylic acid having an isocyanate group through a urethane bond. In Formula (3), X represents a fluorine atom or trifluorocarbon; p and q each independently represent an integer of 0 or more; "p+q" represents an integer of 2 or more; and "p+q" is preferably 10 or more and 15 or less. "Fluorolink AD1700" containing a urethane acrylic group available from Solvay Solexis Inc. and the like can be suitably used as the raw material[3] used in the production of the perfluoropolyether chain in such a category.

Further, the mass ratio of the raw material[3] to the raw material[1], which is required for a graft type copolymer resin to form a microphase-separated structure on the surface of a surface layer, can be 10 to 25 mass % relative to 100 mass % of the raw material[1]. If the mass ratio of the raw material[3] is less than 10 mass %, the size of the domain phase of the perfluoropolyether chain in the graft type copolymer resin will be too small to form a microphase-separated structure. On the other hand, if the mass ratio of the raw material[3] is more than 25 mass %, a microphase-separated structure cannot be formed because the perfluoropolyether chain uniformly segregates over the whole surface. Further, when the mass ratio of the raw material[3] to the raw material[1] in the graft type copolymer is outside the above range, the strength of the surface layer may be extremely reduced.

The following formula (4) shows an example of the bonding form of a polymer in which the raw material[1] and the raw material[2] as described above are connected by graft polymerization. Examples of the products that provide such a graft copolymer resin include "ZX212" and "ZX201" manufactured by T&K TOKA Corporation. Note that, in formula (4), n1 and m each independently represent an integer of 2 or more. Further, n2, n3 and n4 each independently represent an integer of 1 or more.

Formula (4)

The following formula (5) shows an example of the bonding form in which the raw material[1] and the raw material[3] as described above are connected by graft polymerization. Note that, in formula (5), n5 represents an integer of 2 or more. Further, p and q each independently represent an integer of 1 or more. However, "p+q" is an integer of 2 or more.

Formula (5)

Further, in formula (5), n6, n7, n8 and n9 each independently represent an integer of 1 or more.

The graft copolymer resin used in the present invention can be obtained as a resin having a repeated structure of units containing, for example, formula (4) and formula (5).

The intermediate transfer member for electrophotography formed in this way can express low adhesion ideal for the transferability of toner, and the toner transferability at this time can be verified by evaluating with an actual image forming apparatus.

The electrophotographic image forming apparatus (hereinafter also referred to as an "electrophotographic apparatus") 100 according to the present invention of FIG. 3 will be described. The electrophotographic apparatus 100 is a color electrophotographic apparatus of an electrophotographic system (color laser printer). In the electrophotographic apparatus 100 illustrated in FIG. 3, image forming units Py, Pm, Pc and Pk, which are image forming sections of each color component of yellow (Y), magenta (M), cyan (C) and black (K), are sequentially disposed along the flat part of an intermediate transfer belt 7 which is an intermediate transfer member in the direction of movement of the belt. Here, reference characters 1Y, 1M, 1C and 1K each denotes an electrophotographic photosensitive member; reference characters 2Y, 2M, 2C and 2K each denote a charging roller; reference characters 3Y, 3M, 3C and 3K each denote a laser exposure apparatus; reference characters 4Y, 4M, 4C and 4K each denote a developing unit; and reference characters 5Y, 5M, 5C and 5K each denote a primary transfer roller. Since the basic configuration of each image forming unit is the same, the details of the image forming units will be described only on the yellow image forming unit Py.

The yellow image forming unit Py has a drum type electrophotographic photosensitive member (hereinafter also referred to as a "photosensitive drum" or a "first image bearing member") 1Y as an image bearing member. The photosensitive drum 1Y is formed by using an aluminum cylinder as a substrate and sequentially laminating a charge generating layer, a charge transport layer and a surface protective layer on the substrate.

Further, the yellow image forming unit Py has a charging roller 2Y as a charging device. The surface of the photosensitive drum 1Y is uniformly charged by applying a charging bias to the charging roller 2Y.

A laser exposure apparatus 3Y as an image exposure device is disposed above the photosensitive drum 1Y. The laser exposure apparatus 3Y scans and exposes the surface of the uniformly charged photosensitive drum 1Y depending on image information to form an electrostatic latent image of a yellow color component on the surface of the photosensitive drum 1Y.

The electrostatic latent image formed on the photosensitive drum 1Y is developed by toner which is a developer supplied from a developing unit 4Y as a developing device.

That is, the developing unit 4Y has a developing roller 4Ya which is a developer carrier and a regulating blade 4Yb which is a developer amount regulating member and stores yellow toner which is a developer. The developing roller 4Ya to which yellow toner is supplied is in light pressure contact with the photosensitive drum 1Y in the developing section and rotated with a speed difference in a forward direction relative to the photosensitive drum 1Y. The yellow toner conveyed to the developing section by the developing roller 4Ya adheres to the electrostatic latent image formed on the photosensitive drum 1Y by applying a developing bias to the developing roller 4Ya. Thereby, a visible image (yellow toner image) is formed on the photosensitive drum 1Y.

Figure 3:
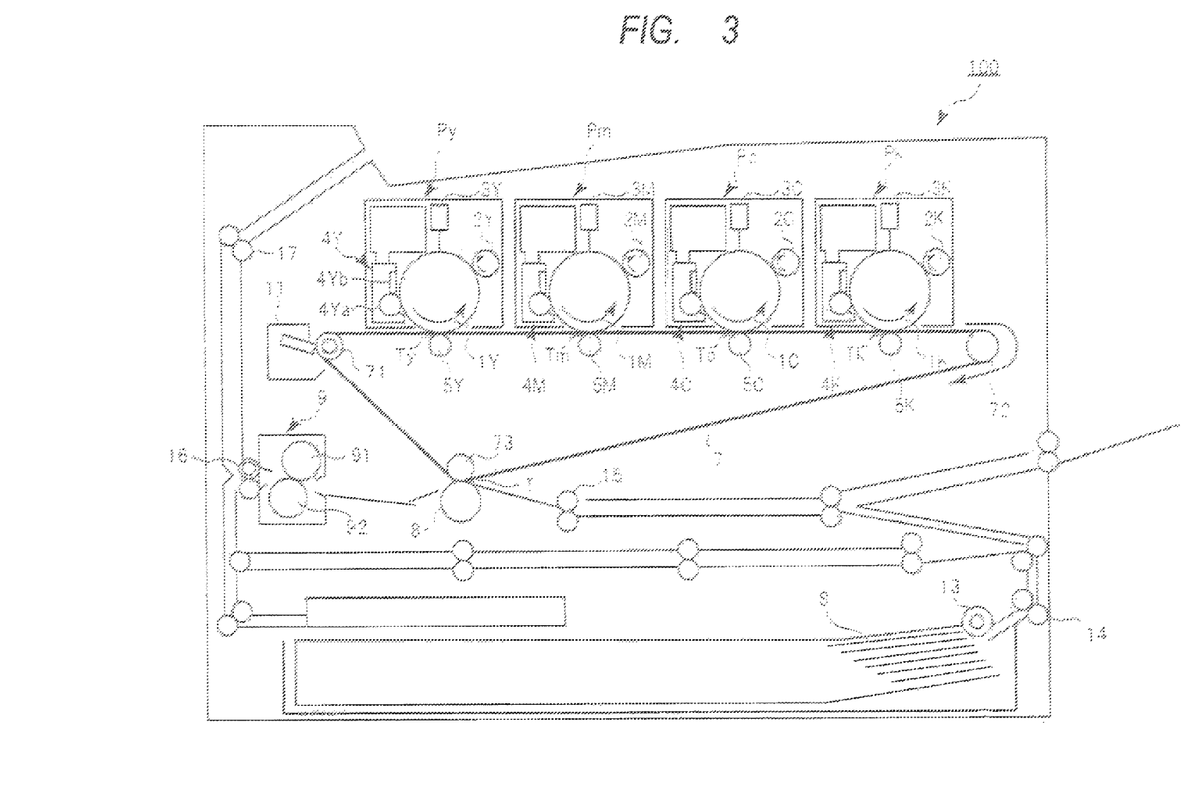
FIG. 3 is a schematic sectional view of an electrophotographic image forming apparatus according to the present invention.

The intermediate transfer belt 7 is stretched around a driving roller 71, a tension roller 72 and a driven roller 73 and moved (rotationally driven) in the direction of the arrow in FIG. 3 in contact with the photosensitive drum 1Y. Then, the yellow toner image formed on the photosensitive drum (first image bearing member) which has reached a primary transfer section Ty is primarily transferred to the intermediate transfer belt 7 (intermediate transfer member) by the primary transfer roller 5Y which is a primary transfer device opposed and pressed to the photosensitive drum 1Y through the intermediate transfer belt 7.

Similarly, the above imaging operation is performed at each unit of Pm, Pc and Pk of magenta (M), cyan (C) and black (K) with the movement of the intermediate transfer belt 7, thus laminating toner images of four colors of yellow, magenta, cyan and black on the intermediate transfer belt 7. The toner layers of four colors are conveyed with the movement of the intermediate transfer belt 7 and, at a secondary transfer section T', collectively transferred to a transfer material S (hereinafter also referred to as a "second image bearing member") conveyed at a predetermined timing by a secondary transfer roller 8 as a secondary transfer device. Generally, in order to secure a sufficient transfer rate, a transfer voltage of several kilovolts is applied in such secondary transfer. However, discharge may occur in the vicinity of a transfer nip at this time. Note that this discharge causes chemical degradation of a transfer member.

The transfer material S is stored in a cassette which is a storage section of a transfer material, separated and fed to the inside of the apparatus by a pickup roller 13, and conveyed to the secondary transfer section T' synchronized with the toner images of four colors transferred to the intermediate transfer belt 7 by a conveying roller pair 14 and a resist roller pair 15.

The toner image transferred to the transfer material S is fixed by a fixing unit 9 to form, for example, a full-color image. The fixing unit 9 has a fixing roller 91 provided with a heating device and a pressurizing roller 92 and heats and pressurizes an unfixed toner image on the transfer material S to thereby fix the toner image. Subsequently, the transfer material S is discharged outside the apparatus by a conveying roller pair 16, a discharge roller pair 17 and the like.

A cleaning blade 11, which is a cleaning device of the intermediate transfer belt 7, is disposed downstream from the secondary transfer section T' in the driving direction of the intermediate transfer belt 7 and removes a transfer residual toner remaining on the intermediate transfer belt 7 without being transferred to the transfer material S in the secondary transfer section T'.

As described above, electric transfer processes of a toner image are repeatedly performed from a photosensitive member to an intermediate transfer belt and from the intermediate transfer belt to a transfer material. Further, the electric transfer processes will be further repeatedly performed by repeating recording to a large number of transfer materials.

Furthermore, the change with time of the efficiency of transfer (secondary transfer) of a toner image from an intermediate transfer belt to a transfer material such as paper is suppressed by using the above-described transfer member for electrophotography according to the present invention as an intermediate transfer belt in the above electrophotographic apparatus. As the result, a high quality electrophotographic image can be formed over a long period of time.

One embodiment of the present invention provides, in the image forming process of an electrophotographic system, a transfer member which has excellent secondary transferability and is reduced in the occurrence of poor transfer such as density unevenness and color unevenness in a printing image.

Further, another embodiment of the present invention provides a transfer member which has resistance also to the physical degradation of the surface of the transfer member in repeated image output and can maintain excellent secondary transferability.

EXAMPLES

Hereinafter, the present invention will be described in detail with reference to Examples. The following examples describe the results of incorporating a belt-shaped intermediate transfer member prepared by applying the present invention to a commercially available image forming apparatus and performing image evaluation, but the present invention is not limited only to these results. Further, although some materials used in Examples are diluted or dispersed with a solvent, the amount of materials used refers to a non-volatile matter unless otherwise indicated and is an amount excluding a solvent (volatile matter).

Example 1

1. Production of Intermediate Transfer Belt

Macromonomer 45%-AA6 (methyl methacrylate) manufactured by Toagosei Co., Ltd. was used as a raw material of macromonomer serving as a main chain. Silaplane FM-0711 (number average molecular weight: 1,000) manufactured by Chisso Corporation was used as a raw material of a polysiloxane chain, and Fluorolink AD1700 (number average molecular weight: 1,000) manufactured by Solvay Solexis Inc. was used as a raw material of a perfluoropolyether chain. These materials in amounts of blending (parts by mass) as shown in Table 1 and methyl isobutyl ketone were used to prepare a mixed dispersion having a resin solid concentration of 25 mass %. Further, 25 parts by mass of a conductive metal oxide (gallium-doped zinc oxide) manufactured by CIK Nanotech Co., Ltd. as an additive and 3 parts by mass of IRGACURE 184 (photopolymerization initiator) available from Ciba Geigy Co., Ltd. as a polymerization initiator were mixed and stirred to obtain a mixed dispersion.

A polyimide intermediate transfer belt with which Image RUNNER ADVANCE C5051 manufactured by Canon Inc. is equipped was prepared as a base layer of a belt-shaped intermediate transfer member. This intermediate transfer belt was coated with the above mixed dispersion to form a coating film, and the coating film was subjected to drying treatment by heating for 3 minutes at a temperature of 70° C. Next, the resulting coating film was irradiated with ultraviolet rays using an ultraviolet irradiation apparatus (UE06/81-3, Eye Graphics Co., Ltd.) until the cumulative amount of light is equal to 1200 mJ/cm$^2$. The coating film was cured in this way to obtain an intermediate transfer belt 1 having a surface layer (cured coating film) thickness of 2 μm.

An acrylic or methacrylic radically polymerizable macromonomer is excellent in polymerizability and can incorporate resins having different physical properties as side chains with good purity. Therefore, about 100% of the raw materials for side chains is basically graft-polymerized to a main chain by performing ultraviolet irradiation or electron beam irradiation in the presence of a photopolymerization initiator. If a resin formed as a polymer (reaction residue) without being grafted to a main chain in the raw materials for side chains is present in the cured coating film, the resin will probably bleed out to the surface of a surface layer with time. However, when the surface was observed with time by elemental analysis, such a reaction residue was not identified.

2. SEM Observation of Intermediate Transfer Belt

The surface and the cross section of the intermediate transfer belt 1 were observed with a scanning electron microscope (SEM, XL-300-SFEG manufactured by FEI). As illustrated in FIG. 1, a state was observed in which a domain phase of perfluoropolyether was uniformly distributed on the surface, and the diameter of the circular domain phase was 0.8 μm. Further, as illustrated in FIG. 2, it was verified in the cross-section observation that the domain phase of perfluoropolyether was present only in the vicinity of the surface, and the depth of the domain phase was 0.2 μm.

Note that, in the preparation of a cross section of the intermediate transfer belt 1, a cross section polisher (SM-09010 manufactured by JEOL, Ltd.) was used to prepare a cross section vertical to the surface. For identifying the components of the matrix phase and the domain phase, elemental mapping was performed with an energy dispersive X-ray analyzer. For identifying the components of the matrix phase, main components of polysiloxane (silicon, oxygen and carbon) were checked, and for identifying the components of the domain phase, main components of perfluoropolyether (fluorine, oxygen and carbon) were detected.

3. Evaluation of Toner Transferability of Intermediate Transfer Belt

A polyimide intermediate transfer belt was removed from a full-color electrophotographic image forming apparatus (trade name: Image RUNNER ADVANCE C5051; manufactured by Canon Inc.), and instead the intermediate transfer belt 1 was attached. Then, the initial output image and the output image after performing a paper-passing durability test of printing 30,000 sheets of paper were evaluated. At this time, plain paper 4024 of Xerox Corp. was used as the paper being a recording medium. Note that the evaluation was performed by outputting a secondary blue color image of cyan and magenta and visually evaluating the image based on the following criteria. The evaluation results are shown in Table 3.
A: Excellent because color unevenness is not observed at all.
B: Good because almost no color unevenness is observed.
C: Good, but poorer than B.
D: Transfer is insufficient in some places, and color unevenness is observed.

Examples 2 to 6

Intermediate transfer belts 2 to 6 were obtained in the same manner as in Example 1 except that, in Example 1, the amount of blending of the raw materials for side chains was changed to the values shown in Table 1. When the surface and the cross section of each intermediate transfer belt were observed in the same manner as in Example 1, it was found that uniform domain phases of perfluoropolyether were present on all the surfaces, and the domain phases of perfluoropolyether were present only in the vicinity of the surface in all the cross sections. The diameter and the depth of the circular domain phases are shown in Table 3. In addition, the results of image evaluation performed in the same manner as in Example 1 are shown in Table 3.

Comparative Examples 1 to 6

Intermediate transfer belts 7 to 12 were obtained in the same manner as in Example 1 except that, in Example 1, the amount of blending of the raw materials for side chains was changed to the values shown in Table 2. When the surface and the cross section of each intermediate transfer belt were observed in the same manner as in Example 1, the presence of the domain phases of perfluoropolyether was not able to be observed on all the surfaces, and the presence of the domain phases of perfluoropolyether was not able to be observed in all the cross sections. The results of the image evaluation performed in the same manner as in Example 1 are shown in Table 3.

TABLE 1

|  |  | Example 1 | Example 2 | Example 3 | Example 4 | Example 5 | Example 6 |
|---|---|---|---|---|---|---|---|
| Main chain | "Macromonomer 45%-AA6 (methyl methacrylate)" manufactured by Toagosei Co., Ltd. | 100 | 100 | 100 | 100 | 100 | 100 |
| Side chain 1 | "Silaplane FM-0711" (number average molecular weight: 1,000) manufactured by Chisso Corporation | 20 | 20 | 20 | 5 | 15 | 40 |
| Side chain 2 | "Fluorolink AD1700" (number average molecular weight: 1,000) manufactured by Solvay Solexis Inc. | 10 | 15 | 25 | 15 | 15 | 15 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Main chain | "Macromonomer 45%-AA6 (methyl methacrylate)" manufactured by Toagosei Co., Ltd. | 100 | 100 | 100 | 100 | 100 | 100 |
| Side chain 1 | "Silaplane FM-0711" (number average molecular weight: 1,000) manufactured by Chisso Corporation | 20 | 20 | 3 | 50 | 20 | 0 |
| Side chain 2 | "Fluorolink AD1700" (number average molecular weight: 1,000) manufactured by Solvay Solexis Inc. | 5 | 30 | 15 | 15 | 0 | 15 |

TABLE 3

|  | Intermediate transfer member | Presence or absence of layer-separated structure | Diameter of circular domain phase μm | Depth of domain phase μm | Image evaluation Initial | Image evaluation After 30,000 sheets |
|---|---|---|---|---|---|---|
| Example 1 | Transfer belt 1 | Presence | 0.8 | 0.2 | A | B |
| Example 2 | Transfer belt 2 | Presence | 1.4 | 0.3 | A | A |
| Example 3 | Transfer belt 3 | Presence | 1.9 | 0.4 | A | A |
| Example 4 | Transfer belt 4 | Presence | 1.5 | 0.2 | A | B |
| Example 5 | Transfer belt 5 | Presence | 1.2 | 0.3 | A | B |
| Example 6 | Transfer belt 6 | Presence | 1.1 | 0.2 | A | B |

TABLE 3-continued

| | Intermediate transfer member | Presence or absence of layer-separated structure | Diameter of circular domain phase μm | Depth of domain phase μm | Image evaluation Initial | Image evaluation After 30,000 sheets |
|---|---|---|---|---|---|---|
| Comparative Example 1 | Transfer belt 7 | Absence | — | — | B | D |
| Comparative Example 2 | Transfer belt 8 | Absence | — | — | A | D |
| Comparative Example 3 | Transfer belt 9 | Absence | — | — | B | D |
| Comparative Example 4 | Transfer belt 10 | Absence | — | — | B | D |
| Comparative Example 5 | Transfer belt 11 | Absence | — | — | C | D |
| Comparative Example 6 | Transfer belt 12 | Absence | — | — | B | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-082768, filed Apr. 14, 2014, which is hereby incorporated by reference herein in its entirety.

What is claimed is:

1. A transfer member for electrophotography comprising a surface layer having a surface for carrying toner, the surface layer containing a graft type copolymer comprising a polymer having a structure represented by formula (1) as a main chain, and
   a group containing a structure represented by formula (2) bonded to the main chain as a side chain and
   a group containing a structure represented by formula (3) bonded to the main chain as a side chain; and
   the surface of the surface layer has a matrix phase formed by a group containing a structure represented by formula (2), and
   a domain phase formed by a group containing a structure represented by formula (3), wherein
   in the copolymer the mass ratio of the group containing the structure represented by formula (2) to the main chain is 5 to 40 mass %, and the mass ratio of the group containing the structure represented by formula (3) to the main chain is 10 to 25 mass %:

Formula (1)

wherein $R^1$ represents a hydrogen atom or a methyl group; $R^2$ represents a hydrogen atom or a hydrocarbon group having 1 to 10 carbon atoms; and n0 represents an integer of 2 or more, Formula (2)

wherein $R^3$, $R^4$, $R^5$, $R^6$, $R^7$, $R^8$ and $R^9$ each independently represent a hydrogen atom or a hydrocarbon group having 1 to 10 carbon atoms; and m represents an integer of 2 or more, Formula (3)

wherein X represents a fluorine atom or trifluorocarbon; p and q each independently represent an integer of 0 or more; and "p+q" represents an integer of 2 or more.

2. The transfer member according to claim 1, wherein the depth of the domain phase is 10 to 15% of the thickness of the surface layer.

3. The transfer member according to claim 1, wherein the thickness of the surface layer is 1 to 20 μm.

4. The transfer member according to claim 1, wherein the diameter of the domain phase is 0.8 to 1.5 μm.

5. The transfer member according to claim 1, further comprising a base layer.

6. The transfer member according to claim 1, having a volume resistivity of $1.0 \times 10^8$ to $1.0 \times 10^{14}$ Ω·cm.

7. The transfer member according to claim 1, having a surface resistivity of $1.0 \times 10^7$ to $1.0 \times 10^{13}$ Ω/□.

8. An electrophotographic image forming apparatus comprising a first image bearing member, an intermediate transfer member, a device which primarily transfers a toner image formed on the first image bearing member to the intermediate transfer member and a device which secondarily transfers the toner image primarily transferred to the intermediate transfer member to a second image bearing member, wherein
   the intermediate transfer member is the transfer member according to claim 1.

* * * * *